US010813491B2

(12) United States Patent
Delrue et al.

(10) Patent No.: US 10,813,491 B2
(45) Date of Patent: Oct. 27, 2020

(54) APPLIANCE FOR COOKING BY HEATING FLOW WITH STIRRING MEANS

(71) Applicant: SEB S.A., Ecully (FR)

(72) Inventors: Olivier Delrue, Selongey (FR); Frédéric Seurat, Bretigny (FR); Johann Petitallot, Dijon (FR); Jean-Claude Bizard, Fontaine les Dijon (FR); Rodolphe Lordonnois, Dijon (FR); Jérémy Cornu, Dijon (FR)

(73) Assignee: SEB S.A. (FR)

( * ) Notice: Subject to any disclaimer, the term of this patent is extended or adjusted under 35 U.S.C. 154(b) by 298 days.

(21) Appl. No.: 15/935,824

(22) Filed: Mar. 26, 2018

(65) Prior Publication Data

US 2018/0271321 A1 Sep. 27, 2018

(30) Foreign Application Priority Data

Mar. 27, 2017 (FR) ..................................... 17 52538

(51) Int. Cl.

*A47J 27/00* (2006.01)
*A47J 36/16* (2006.01)
*F24C 15/32* (2006.01)
*A47J 37/04* (2006.01)
*A47J 37/06* (2006.01)

(52) U.S. Cl.

CPC ........... *A47J 36/165* (2013.01); *A47J 27/004* (2013.01); *A47J 37/043* (2013.01); *A47J 37/0641* (2013.01); *F24C 15/325* (2013.01)

(58) Field of Classification Search

CPC .... A47J 36/165; A47J 37/043; A47J 37/0641; F24C 15/325

See application file for complete search history.

(56) References Cited

U.S. PATENT DOCUMENTS

2008/0163764 A1* 7/2008 Payen .................. A47J 37/043 99/447
2015/0000535 A1* 1/2015 Yoshidome ........... F24C 15/327 99/331

(Continued)

FOREIGN PATENT DOCUMENTS

CN 205697284 U 11/2016
FR 2 871 042 A1 12/2005
FR 3 029 096 A1 6/2016

OTHER PUBLICATIONS

Search Report as issued in French Patent Application No. 1752538, dated Dec. 1, 2017.

*Primary Examiner* — Jason L Vaughan
*Assistant Examiner* — Amanda Kreiling
(74) *Attorney, Agent, or Firm* — Lerner, David, Littenberg, Krumholz & Mentlik, LLP

(57) ABSTRACT

A cooking appliance includes a housing including a first compartment forming a cooking space, equipped with a holding device provided to receive ingredients, a stirring device arranged inside the holding device, the holding device and the stirring device being designed to be animated by a relative rotation with respect to each other, the housing further including a main heating device, including, in a second compartment, a ventilation system to generate a heating flow, wherein the ventilation system includes a cross-flow fan, and the main heating device includes at least one heating element arranged inside the first compartment.

14 Claims, 2 Drawing Sheets

(56) References Cited

U.S. PATENT DOCUMENTS

| | | | | |
|---|---|---|---|---|
| 2015/0201806 | A1* | 7/2015 | Yoshidome ........... | A47J 27/004<br>99/447 |
| 2015/0292750 | A1* | 10/2015 | Delrue .................. | F24C 15/325<br>219/400 |

* cited by examiner

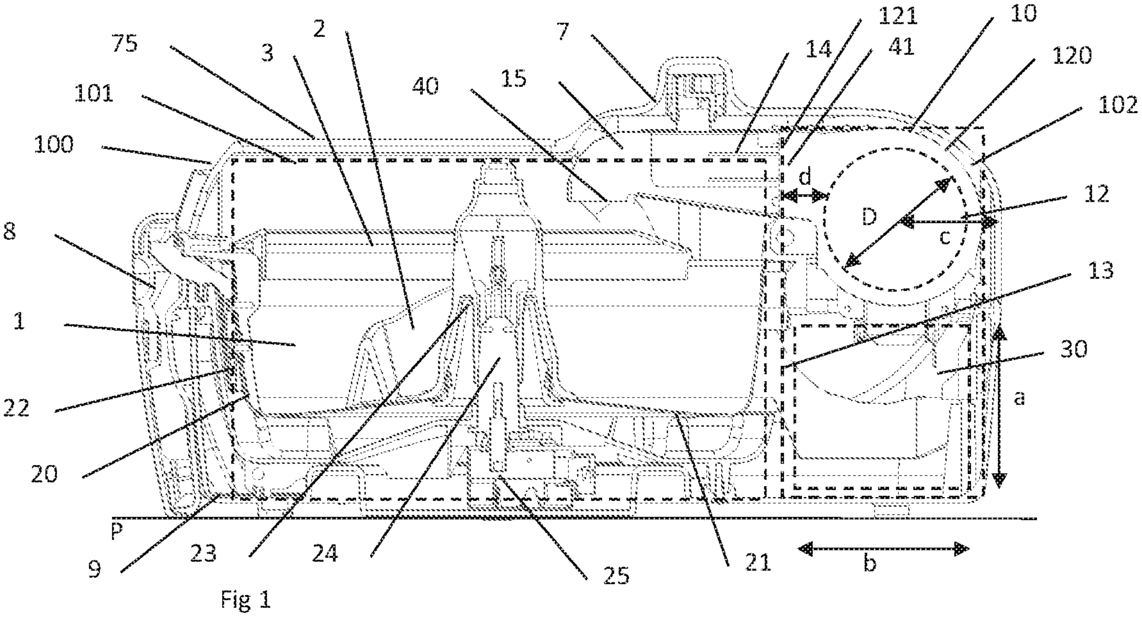
Fig 1
Fig 2
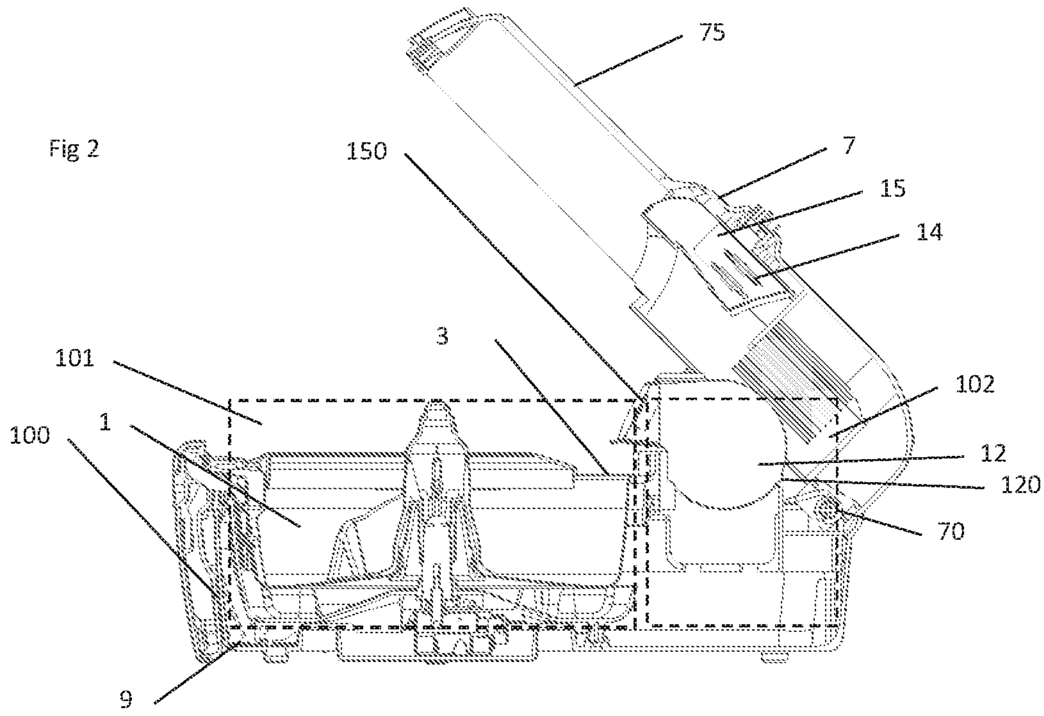

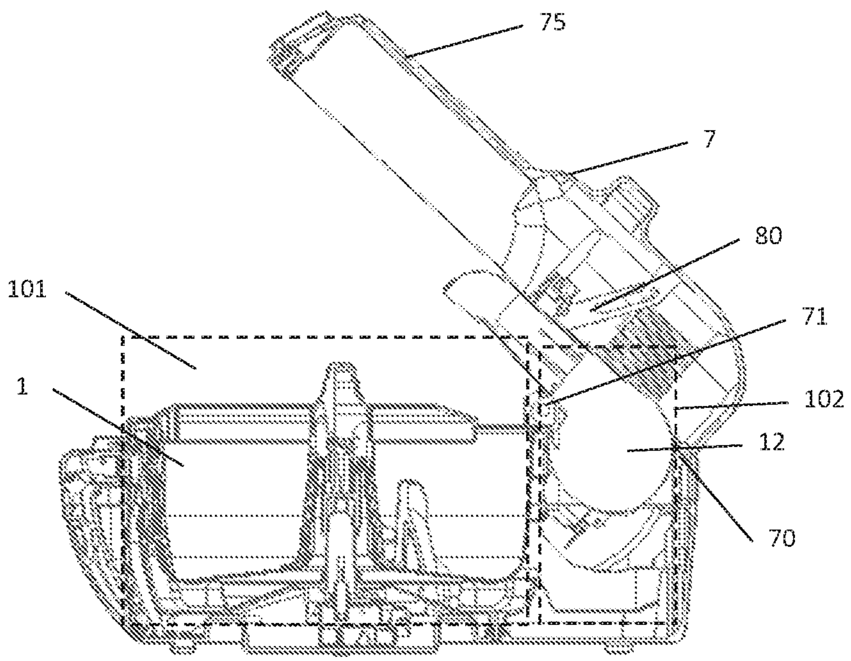
Fig 3
Fig 4
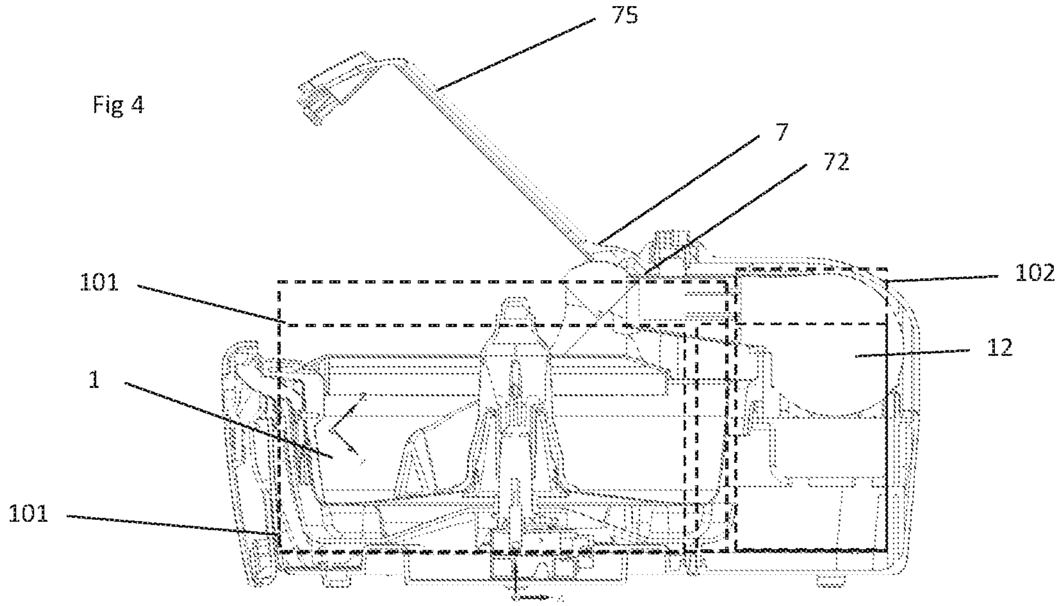

APPLIANCE FOR COOKING BY HEATING FLOW WITH STIRRING MEANS

CROSS-REFERENCE TO RELATED APPLICATIONS

This application claims priority to French Patent Application No. 1752538, filed Mar. 27, 2017, the entire content of which is incorporated herein by reference in its entirety.

FIELD

This invention concerns the field of electric cooking appliances comprising a stirring device arranged in a food holding device.

BACKGROUND

The document FR2871042 describes an appliance for cooking by air flow comprising a stirring device. The appliance comprises a container in which the food is cooked. The hot air flow is generated by a centrifugal fan which aspirates air in the cooking chamber and moves it over heating elements. The heated air is then routed over the container by means of a conduit forming a nozzle. Although the appliance described in this document yields satisfactory cooking results, the appliance is noisy and bulky.

SUMMARY

An aspect of this invention is to propose a quieter and more compact appliance for cooking by heating flow and stirring device. Another aspect of this invention consists of making the heating device more efficient.

These aspects are achieved with a cooking appliance comprising a housing comprising a first compartment forming a cooking space, equipped with a holding device provided to receive ingredients, a stirring device arranged inside the holding device, the holding device and the stirring device being designed to be animated by a relative rotation with respect to each other, the housing comprises a main heating device, comprising, in a second compartment, a ventilation system to generate a heating flow, wherein in that the ventilation system comprises a cross-flow fan, the main heating device comprises at least one heating element arranged inside the first compartment.

The use of a cross-flow fan permits, firstly, reducing the noise of the appliance in use. The positioning of heating device in the first compartment permits reducing the footprint, in particular the length of the appliance. In addition, the use of a cross-flow fan permits having a flow that is linear and not disturbed, which produces homogeneous cooling of the heating element. Thus, a heating element in the form of a filament wound around mica will no longer have red spots on the filament during heating. This also permits uniform winding of the wire on the mica.

Finally, it is recalled that the combination of the position of the cross-flow fan and of the at least one heating element is a determining factor in the achievement of cooking performances. This implies working on the air flow, geometry and sizing of the cross-flow fan, but also of the at least one heating element.

According to another embodiment, the second compartment comprises an intake area upstream from the cross-flow fan, arranged between the cooking space and the ventilation system, and in communication with the ventilation system.

According to another embodiment, the height of the intake area is at least equal to the diameter of the cross-flow fan.

According to another embodiment, the width of the intake area is at least equal to 1.5 times the diameter of the cross-flow fan.

According to another embodiment, the distance between the axis of the cross-flow fan and an outer edge of the housing is at least equal to 0.7 times the diameter of the cross-flow fan.

According to another embodiment, the main heating device comprises a nozzle to guide the heating flow toward the holding device, the nozzle discharging into the first compartment.

According to another embodiment, the at least one heating element is arranged in the nozzle.

According to another embodiment, the distance between the perimeter of the cross-flow fan and the adjacent extremity of the nozzle is at least equal to 0.3 times the diameter of the cross-flow fan.

According to another embodiment, the housing comprises a lid pivotally mounted and covering the first and second compartments, the pivoting axis being positioned between the second compartment and the outer edge of the housing.

According to another embodiment, the nozzle is integral with the lid and the ventilation system is fixed in the second compartment.

According to another embodiment, the nozzle is integral with the ventilation system and the ventilation system pivots in the same direction as the lid, the pivoting axis of the ventilation system being positioned between the first compartment and the second compartment.

According to another embodiment, the housing comprises a lid pivotally mounted and covering at least the first compartment, the pivoting axis being positioned between the first compartment and the second compartment.

According to another embodiment, the lid covers only the first compartment and the ventilation system is fixed in the second compartment.

According to another embodiment, lid covers the first and second compartments, the ventilation system pivots in the same direction as the lid, the pivoting axis of the ventilation system coinciding with the pivoting axis of the lid.

BRIEF DESCRIPTION OF THE DRAWINGS

Other benefits and particularities of this invention will appear in the description of the embodiments provided as a non-restrictive example and illustrated in the attached drawings, where:

FIG. 1 is a longitudinal cross-section view of a first embodiment example of a cooking appliance according to the invention;

FIG. 2 is a longitudinal cross-section view of the first embodiment example of the cooking appliance with the lid in an open position;

FIG. 3 is a longitudinal cross-section view of a second embodiment example of the cooking appliance with the lid in an open position; and FIG. 4 a longitudinal cross-section view of a third embodiment example of the cooking appliance with the lid in an open position.

DETAILED DESCRIPTION

The cooking appliance represented in FIG. 1 comprises a housing 100 comprising a first compartment 101 and a second compartment 102. The first compartment 101 roughly corresponds to the cooking area of the appliance according to an embodiment of the invention. The first compartment 101 comprises a holding device 1 or container provided to receive the ingredients and a stirring device 2 arranged inside the holding device or container 1. The holding device 1 has a top opening 3. The holding device 1 and the stirring device 2 are designed to be animated by a relative rotation with respect to each other. This movement is ensured by a motor 25 placed beneath the container.

The cooking appliance comprises at least one main heating device 10, also broadly referred to as a heater. As represented in FIG. 1, the main heating device 10 generates a heating flow entering the holding device 1 through the top opening 3.

More specifically, the holding device 1 is formed of a chamber 20 comprising a bottom 21 and a side wall 22. According to the embodiment variant in FIG. 1, the bottom 21 slopes down toward the side wall 22. The chamber 20 has a central opening 23 provided for the passage of a drive shaft 24 rotationally driven by a motor 25. The stirring device 2 is mounted on the drive shaft 24. The chamber 20 is beneficially made of metallic material, for example coated metallic material or stainless steel in an embodiment of the invention. The holding device 1 has a handle 8. The holding device 1 is mounted detachably with respect to the housing 100. According to an embodiment of the invention, the main heating device 10 comprises a cross-flow fan 12 mounted in the second compartment 102 of the housing 100. The fan 12 is, for example, mounted in a cabinet 120. The axis of the cross-flow fan 12 is roughly parallel to the work top P.

The fan 12 is provided to aspirate the air in the first compartment 101 through an air intake 13 and to propel the air over a heating element 14 arranged in a nozzle 15. The nozzle 15 discharges into the first compartment 101 at an outlet 40. The outlet 40 of the nozzle 15 is positioned above the holding device 1. Another extremity 41 of the nozzle is adjacent to an outlet opening 121 of the cabinet 120.

According to an embodiment of the invention, the heating element 14 is positioned in the first compartment 101. This particular configuration permits reducing the size of the cooking appliance according to an embodiment of the invention.

For example, the heating element 14 consists of a resistive wire wound around a perforated mica support inserted in a metallic body. The winding density of the wire is adjusted to limit pressure drops and the formation of red spots during operation.

According to an embodiment variant, the heating element 14 may comprise 2 perforated mica supports.

According to an embodiment variant, the nozzle 15 is also positioned in the first compartment 101.

The second compartment 102 comprises an intake area 30 situated upstream from the cross-flow fan 12. This intake area 30 is configured to reduce pressure drops upstream from the cross-flow fan 12. The intake area 30 is aeraulically connected to the first compartment 101 through the air intake 13.

In an embodiment, beneficially, the dimensions of the intake area 30 are the following:

- The height a is at least equal to the diameter D of the cross-flow fan 12;
- The width b is at least equal to 1.5 times the diameter D of the cross-flow fan 12;
- The distance c between the (longitudinal) axis of the cross-flow fan 12 and an outer edge of the housing 100 is at least equal to 0.7 times the diameter D of the cross-flow fan 12;
- The distance d between the perimeter of the cross-flow fan 12 and the outlet opening of the cabinet 120 is at least equal to 0.3 times the diameter D of the cross-flow fan 12.

The housing 100 of the appliance according to an embodiment of the invention also comprises a lid 7 and a base 9. The lid 7 is configured to cover at least the first compartment 101. The lid 7 may comprise a transparent window 75 positioned over the first compartment 101 to permit the user to monitor the progress of the cooking.

According to the embodiment variant in FIG. 2, the lid 7 is shaped to cover both the first compartment 101 and the second compartment 102. The lid 7 is mounted on the base 9 according to a pivoting axis 70. According to this variant, the pivoting axis 70 is situated in the second compartment 102, as far as possible from the first compartment 101. As an example, the pivoting axis 70 is situated near the outer edge of the housing 1.

This configuration allows extensive access to the first compartment 101, which facilitates the introduction and removal of the container 1 during food preparation.

To further increase the accessibility of the first compartment 101, the nozzle 15 is mounted on the inner face of the lid 7. A gasket 150 may be provided on the extremity of the nozzle 15 to prevent leakage of hot air between the nozzle 15 and the cabinet 120 of the cross-flow fan 12. In this embodiment variant, when the lid 7 is in an open position, the entirety of the top opening 3 of the container 1 is accessible. This facilitates the introduction of food.

According to this embodiment variant, the fan 12 is fixed in relation to the housing 100.

The embodiment variant presented in FIG. 3 is identical in all respects to the embodiment variant in FIG. 2, except that the fan 12 is also pivotally mounted in relation to the housing 100. The direction of the pivot of the fan 12 is identical to that of the lid 7. The pivoting axis 71 of the fan is situated between the first compartment 101 and the second compartment 102, for example at the upper edge of the container 1. To synchronize the movement of the lid 7 and of the fan, a connecting rod 80 connects the lid 7 and the fan 12. According to the embodiment variant, the connecting rod 80 is, for example, fixed on the nozzle 15, itself integral with the cabinet 120 of the fan.

According to another embodiment variant not represented, the pivoting axis of the lid coincides with the pivoting axis of the fan. This axis is, for example, situated between the first and the second compartment of the housing.

According to the embodiment variant in FIG. 4, the lid 7 is shaped to cover only the first compartment 101. The lid 7 is mounted on the base 9 according to a pivoting axis 72. According to this variant, the pivoting axis 72 is situated between the first compartment 101 and the second compartment 102 in an area situated over the top opening 3 of the container 1.

As a variant, the holding device 1 is not necessarily formed of a chamber. The holding device has, in an embodiment, a bottom and a side wall. The holding device may in particular be formed of a perforated basket.

This invention is in no way limited to the examples described, but encompasses many modifications in the context of the claims.

The invention claimed is:

1. A cooking appliance comprising a housing comprising a first compartment forming a cooking space, equipped with a holding device provided to receive ingredients, a stirring device arranged inside the holding device, the holding device and the stirring device being configured to be animated by a relative rotation with respect to each other, the housing further comprising a main heating device, comprising, in a second compartment, a ventilation system configured to generate a heating flow, wherein the ventilation system comprises a cross-flow fan, and the main heating device comprises at least one heating element arranged inside the first compartment, and wherein a longitudinal axis of the cross-flow fan is tangential to the first compartment.

2. The cooking appliance according to claim 1, wherein the second compartment comprises an intake area upstream from the cross-flow fan, arranged between the cooking space and the ventilation system, and in communication with the ventilation system.

3. The cooking appliance according to claim 2, wherein a height of the intake area is at least equal to a diameter of the cross-flow fan.

4. The cooking appliance according to claim 2, wherein a width of the intake area is at least equal to 1.5 times a diameter of the cross-flow fan.

5. The cooking appliance according to claim 2, wherein a distance between an axis of the cross-flow fan and an outer edge of the housing is at least equal to 0.7 times a diameter of the cross-flow fan.

6. The cooking appliance according to claim 1, wherein the main heating device comprises a nozzle to guide the heating flow toward the holding device, the nozzle discharging into the first compartment.

7. The cooking appliance according to claim 6, wherein the at least one heating element is arranged in the nozzle.

8. The cooking appliance according to claim 6, wherein a distance between a perimeter of the cross-flow fan and an adjacent extremity of the nozzle is at least equal to 0.3 times a diameter of the cross-flow fan.

9. The cooking appliance according to claim 1, wherein the housing comprises a lid pivotally mounted and covering the first and second compartments, the pivoting axis being positioned between the second compartment and an outer edge of the housing.

10. The cooking appliance according to claim 9, wherein the main heating device comprises a nozzle to guide the heating flow toward the holding device, the nozzle discharging into the first compartment, and wherein the nozzle is integral with the lid and the ventilation system is fixed in the second compartment.

11. The cooking appliance according to claim 1, wherein the housing comprises a lid pivotally mounted and covering at least the first compartment, a pivoting axis of the lid being positioned between the first compartment and the second compartment.

12. The cooking appliance according to claim 11, wherein the lid covers only the first compartment and the ventilation system is fixed in the second compartment.

13. A cooking appliance comprising:

a housing comprising:

a first compartment forming a cooking space, equipped with a holding device provided to receive ingredients, a stirring device arranged inside the holding device, the holding device and the stirring device being configured to be animated by a relative rotation with respect to each other, a main heating device comprising, in a second compartment, a ventilation system configured to generate a heating flow, wherein the ventilation system comprises a cross-flow fan, and the main heating device comprises at least one heating element arranged inside the first compartment, wherein the housing comprises a lid pivotally mounted and covering the first and second compartments, the pivoting axis being positioned between the second compartment and an outer edge of the housing, and wherein the main heating device comprises a nozzle to guide the heating flow toward the holding device, the nozzle discharging into the first compartment, wherein the nozzle is integral with the ventilation system and the ventilation system is configured to pivot in a same direction as the lid, a pivoting axis of the ventilation system being positioned between the first compartment and the second compartment.

14. A cooking appliance comprising:

a housing comprising:

a first compartment forming a cooking space, equipped with a holding device provided to receive ingredients, a stirring device arranged inside the holding device, the holding device and the stirring device being configured to be animated by a relative rotation with respect to each other, a main heating device comprising, in a second compartment, a ventilation system configured to generate a heating flow, wherein the ventilation system comprises a cross-flow fan, and the main heating device comprises at least one heating element arranged inside the first compartment, and wherein the housing comprises a lid, wherein the lid covers the first and second compartments, the ventilation system configured to pivot in a same direction as the lid, a pivoting axis of the ventilation system coinciding with a pivoting axis of the lid.

* * * * *